US012800983B2

(12) United States Patent
Moseland

(10) Patent No.: US 12,800,983 B2
(45) Date of Patent: Nov. 17, 2026

(54) FIBER ARRANGEMENT, AN OPTICAL SYSTEM AND A METHOD OF OPERATING AN OPTICAL SYSTEM

(71) Applicant: NKT Photonics A/S, Birkerød (DK)

(72) Inventor: Peter Moselund, Birkerød (DK)

(73) Assignee: HAMAMATSU PHOTONICS A/S, Birkerød (DK)

( * ) Notice: Subject to any disclaimer, the term of this patent is extended or adjusted under 35 U.S.C. 154(b) by 204 days.

(21) Appl. No.: 18/555,408

(22) PCT Filed: Apr. 11, 2022

(86) PCT No.: PCT/DK2022/050076
§ 371 (c)(1),
(2) Date: Oct. 13, 2023

(87) PCT Pub. No.: WO2022/218491
PCT Pub. Date: Oct. 20, 2022

(65) Prior Publication Data

US 2024/0201562 A1 Jun. 20, 2024

(30) Foreign Application Priority Data

Apr. 16, 2021 (DK) ............................ PA202170177

(51) Int. Cl.
*G02F 1/365* (2006.01)
*G02F 1/35* (2006.01)

(52) U.S. Cl.
CPC ............ *G02F 1/365* (2013.01); *G02F 1/3528* (2021.01)

(58) Field of Classification Search
CPC ... G02F 1/35–392; G02F 1/3528; G02F 1/365
See application file for complete search history.

(56) References Cited

U.S. PATENT DOCUMENTS 9,069,130 B2 * 6/2015 Yun ........................ H01S 3/168
9,160,137 B1 10/2015 Abdolvand et al.
(Continued)

FOREIGN PATENT DOCUMENTS

CN 102023132 A 4/2011
CN 212485786 U 2/2021
(Continued)

OTHER PUBLICATIONS

International Search Report and Written Opinion received for PCT Patent Application No. PCT/DK2022/050076, mailed on Jul. 22, 2022, 9 pages.

(Continued)

*Primary Examiner* — Rhonda S Peace
(74) *Attorney, Agent, or Firm* — Boone IP Law

(57) ABSTRACT

A fiber arrangement, in particular for providing broadband light, preferably in the ultraviolet frequency range, comprises: a hollow core optical fiber (11), and at least one housing (15) having a chamber (27) in which a piezo device (25) is arranged, the piezo device (25) having a variable length and the chamber (27) being in fluid communication with a hollow core (13) of the fiber (11) such that a change of length of the piezo device (25) causes a change of the size of a volume (23) which is provided by the hollow core (13) and the chamber (27) for a fluid, such as a gas or a mixture of gases.

20 Claims, 8 Drawing Sheets

(56) References Cited

U.S. PATENT DOCUMENTS

| | | | | |
|---|---|---|---|---|
| 10,243,319 | B1 * | 3/2019 | Keyser | H01S 3/134 |
| 10,884,313 | B2 * | 1/2021 | Gould | G02B 6/3508 |
| 10,969,542 | B2 * | 4/2021 | Sabert | G01K 11/3206 |
| 11,025,028 | B2 * | 6/2021 | Iguchi | G02F 1/365 |
| 11,163,208 | B2 * | 11/2021 | Uebel | G02F 1/365 |
| 11,372,154 | B2 * | 6/2022 | Sabert | G02F 1/365 |
| 11,556,044 | B2 * | 1/2023 | Uebel | G03F 9/7065 |
| 11,835,842 | B2 * | 12/2023 | Cousin | G02F 1/3503 |
| 2002/0196995 | A1 * | 12/2002 | Kersey | G02B 6/29389 385/13 |
| 2012/0082410 | A1 | 4/2012 | Peng et al. | |
| 2015/0086148 | A1 | 3/2015 | Liu et al. | |
| 2018/0059508 | A1 | 3/2018 | Knappe | |
| 2019/0353979 | A1 | 11/2019 | Kambhampati | |
| 2020/0200950 | A1 | 6/2020 | Watson et al. | |
| 2020/0232611 | A1 * | 7/2020 | Raring | H01S 5/0233 |
| 2020/0285129 | A1 * | 9/2020 | Uebel | G03F 7/70616 |
| 2023/0146877 | A1 | 5/2023 | Uebel et al. | |
| 2024/0118584 | A1 * | 4/2024 | Ravensbergen | G02F 1/3528 |
| 2024/0201562 | A1 * | 6/2024 | Moselund | G02F 1/365 |

FOREIGN PATENT DOCUMENTS

| | | | |
|---|---|---|---|
| EP | 3705942 | A1 | 9/2020 |
| GB | 2502142 | A | 11/2013 |
| JP | H2176469 | A | 7/1990 |
| JP | H6310817 | A | 11/1994 |
| JP | 2003107257 | A | 4/2003 |
| JP | 2014219677 | A | 11/2014 |
| JP | 2019504352 | A | 2/2019 |
| JP | 2020514785 | A | 5/2020 |
| WO | 2012165110 | A1 | 12/2012 |

OTHER PUBLICATIONS

Koehler. R. et al: "Long-lived refractive-index changes induced by femtosecond ionization in gas-filled single-ring photonic-crystal fibers." Arxiv Org cornell University Ithaca Ny 14853, Physical Review Applied 10.064020, (Sep. 20, 2018).

Marty. P. et al: "All-fiber multi-purpose gas cells and their applications in spectroscopy." Journal of Lightwave Technology vol. 28 No. 8 (Apr. 15, 2010), pp. 1236-1240.

Notification Concerning Transmittal of International Preliminary Report on Patentability for International Application No. PCT/DK2022/050076 Date of Mailing Oct. 26, 2023, 7 pages.

Japanese Office Action for Application No. 2023-562855 dated Apr. 30, 2026 issued by the Japanese Patent Office with English translation, 6 pages.

* cited by examiner

FIBER ARRANGEMENT, AN OPTICAL SYSTEM AND A METHOD OF OPERATING AN OPTICAL SYSTEM

This application is the U.S. National Stage of International Application No. PCT/DK2022/050076, filed Apr. 11, 2022, which designates the U.S., published in English, and claims priority under 35 U.S.C. § 119 or 365 (c) to Denmark Application No. PA202170177, filed Apr. 16, 2021. The entire teachings of the above applications are incorporated herein by reference.

The present disclosure relates to a fiber arrangement, in particular for providing broadband light, preferably in the ultraviolet frequency range, an optical system and a method of operating an optical system.

Hollow core optical fibers can be employed for converting input radiation to broadband radiation. A hollow core of such an optical fiber can be filled with a fluid, in particular a gas. For example, a fluid-filled hollow core fiber can be used to generate broadband light pulses in the ultraviolet frequency range from suitable laser pulses input into the hollow core of the fiber. The output broadband light pulses can for example have a spectral width between approximately 25 nm and 125 nm and they can have a center wavelength between approximately 375 nm and 240 nm. The width of a broadband pulse is typically narrower the lower the center wavelength of the broadband pulse is. The position of the center wavelength of a broadband output pulse depends on the pressure of the fluid in the hollow core. The center wavelength of a broadband output pulse is typically larger the higher the pressure of the fluid in the core is. Thus, a plurality of broadband output pulses with different center wavelengths can be generated using different pressures for the fluid in the core, and these broadband output pulses can cover a broad spectral range, for example in the ultraviolet region with wavelengths between 225 nm and 450 nm. It can be desirable to change quickly the spectra provided by the broadband output pulses. Furthermore, it can be desirable to be able to sweep rapidly over the broad spectral range that is covered by such plurality of broadband output pulses.

It is therefore an object of the present invention to provide a fiber arrangement that can provide laser light pulses, in particular broadband light pulses, and that for example allows a rapid sweep over a broad spectral range.

The object is satisfied by a fiber arrangement in accordance with the features of claim 1. Preferred embodiments of the present invention are described in the dependent claims.

In some embodiments, a fiber arrangement, in particular for providing broadband light, preferably in the ultraviolet frequency range, comprises a hollow core optical fiber, and at least one housing having a chamber in which a piezo device is arranged, the piezo device having a variable length and the chamber being in fluid communication with a hollow core of the fiber such that a change of length of the piezo device causes a change of the size of a volume which is provided by the hollow core and the chamber for a fluid, such as a gas or a mixture of gases.

As the piezo device can change the size of the volume, which is provided for the fluid in the hollow core of the fiber and in the chamber, the pressure of the fluid can be changed correspondingly. In particular, the ideal gas law $P=nRT/V$, with P being the pressure, n being the number of Moles, R being the universal gas constant, T being the temperature in Kelvin, and V being the volume, indicates that the pressure is proportional to the inverse of the volume. Thus, a reduction of the volume that is available for the fluid in the hollow core and the chamber causes a pressure increase, while an increase of the volume causes a pressure decrease.

The change in volume is obtained from a change of the length of the piezo device. The length of the piezo device can be changed very rapidly, for example in the order of some 10 kHz. Moreover, piezo devices usually provide a long-term reliability. Thereby, for example, the spectra of broadband output pulses obtained from inputting laser pulses into the fluid-filled hollow core fiber can be changed rapidly with a high degree of reproducibility in dependence on the length of the piezo device.

The piezo device can include or be formed of a piezo material which can change its length in response to an electric signal that is provided to the piezo material. Such piezo materials are per se known in the prior art.

The housing can house the piezo device in the chamber in a gas tight fashion, so that the fluid communication between the chamber and the hollow core is gas tight with regard to the environment.

The housing can comprise a through-hole having an opening at a first axial end of the housing and an opening at a second axial end of the housing, and the fiber can be inserted in the through hole. The through-hole can receive the fiber, and the chamber can be in fluid communication with the through-hole. The through-hole can seal the fiber in a gas tight fashion. The diameter of the through-hole can match with or be slightly larger than the outer diameter of the fiber.

In some embodiments, the housing is a ferrule, which is attached to the fiber, and the ferrule comprises a tube-like body, which provides the through-hole in which the fiber is inserted. The ferrule can be easily fixed to the fiber, in particular in a gas tight fashion.

In these embodiments, where the housing is a ferrule, and where the housing is generally a housing, such a as a cell or chamber, it is noted that according to the present disclosure, the piezo device is arranged is arranged in the housing. This may imply that when the piezo device is operated, and its length is changed, then the length of the fiber is also changed. In other words, the present disclosure provides a control of the volume of the fluid inside the fiber by controlling the length of the fiber via controlling the volume and/or length of the housing using the piezo device arranged in the housing. This particular arrangement ensures not only rapid change of the pressure of the gas, but also a very precise control of the pressure of the gas. Accordingly, the present disclosure provides a solution to both rapidly and precisely control the pressure inside a fiber, in particular such that broadband light pulses can be generated very efficiently.

The prior art, such as EP3705942, typically control the pressure inside a fiber by controlling the pressure in a direct manner.

Although the ideal gas law is known in the field, controlling the pressure of a fiber in an indirect manner, by controlling the volume, has not previously been done, simply because controlling the pressure in a fiber in a direct manner has been the most obvious and simplest manner. Further, when the pressure is controlled in a fiber via either regulating the pressure, in particular to high pressures as in EP3705942, and/or the temperature, the housing for the fiber is made very robust to volume changes, and accordingly the housing is configured to withstand changes in volume.

In other words, in the prior art related to pressure control of liquids in fibers, particularly for broadband light pulse generation, changing the volume of the housing for the fiber is not an option.

The present disclosure provides a new insight to the field of controlling the pressure in fibers, in particular for broadband light pulse generation, using a housing that is now configured to change its volume.

A ferrule is as described above an embodiment of a housing. A ferrule is known in the field of fiber optics, and thus known as fiber optic ferrules. Fiber optic ferrules are mechanical fixtures, generally rigid tubes, which may be configured to confine the stripped end of a fiber or a fiber bundle. A fiber optic ferrules may be configured to align and/or polish the optical fiber, for example to prevent the scattering and dampening of the light signal. Most fiber optic ferrules are made of metals such as stainless steel, ceramics such as alumina or zirconia, or plastic materials. Fiber optic ferrules made of borosilicate glass and glass are also available. Most fiber optic ferrules are manufactured with direct-draw or redraw processes and cut to length with diamond saw blades. To prevent problems such as splice loss and end gaps, they are bored through the center at a diameter which is slightly larger than that of the fiber cladding. Lead-ins are then blown, acid-etched, or drilled countersunk.

In the embodiments, where the housing is a ferrule, in particular a fiber optic ferrule as described above, the ferrule may serve both to confine the stripped end of the fiber, and to control the pressure in the fiber. The pressure in the fiber is as previously described, controlled via the ferrule and via the piezo device. In one embodiment, the ferrule is a fiber optic ferrule configured to hold and align the fiber, and wherein the piezo device is arranged in the ferrule such that the volume of the fiber is controlled via the piezo device and via the fiber optic ferrule. The material of the ferrule may in this embodiment define the reaction to the volume change as set by the piezo device. The use of a fiber optic ferrule in combination with a piezo device allows for a compact design that is able to both hold the fiber, hold the liquid, and to control the pressure of the liquid in the fiber. When the piezo device is arranged in the fiber optic ferrule, the length of the fiber can be controlled very precisely. Accordingly, the volume, and hence the pressure inside the fiber can be controlled both very precisely and very rapidly.

In some embodiments, the housing, in particular a ferrule, is attached to an end of the fiber or at least two housings, in particular ferrules, are provided with one housing being attached to one end of the fiber and the other housing being attached to the other end of the fiber.

An optical window can close the opening of the through-hole on the first axial end of the respective housing and a fiber end can be inserted in the second axial end of the through-hole of the housing. The housing in conjunction with the optical window can be used to seal an end of the fiber.

The chamber can have an annular form and the chamber can extend in a circumferential direction around a through-hole of the housing. Thus, a compact arrangement can be obtained.

The chamber can comprise a center axis which is arranged in parallel or at an angle to a center axis of a through-hole of the housing. The center axis of the chamber can define the direction along which the piezo device can change its length. The direction along which the piezo device can extend its length can for example be at an angle of 90° with regard to the center axis of the through-hole and thus to the center axis of the fiber.

The chamber can be dimensioned such that the piezo device is appropriately received in the chamber. The form of the chamber can match with the form of the piezo device, and the dimensions of the chamber can at least approximately correspond to the dimensions of the piezo device.

In some embodiments, a filling, in particular a gas tight filling and/or a filling of a deformable material, is arranged between an outer surface of the piezo device and an inner surface of the chamber. The piezo device can be cushioned in the filling, and the filling can compensate a decrease of the outer diameter of the piezo device while the piezo device is extended in length. The filling can seal the region between the outer surface of the piezo device and the inner surface of the chamber.

In some embodiments, in a maximally extended position of the piezo device, the piezo device extends over the complete length of the chamber in which the piezo device is arranged.

In some embodiments, one or more fluid channels extend in a radial direction through the housing to fluidly connect the chamber with the through-hole provided in the housing.

In some embodiments, a number of fluid channels is spaced evenly around the circumference of a through-hole of the housing. The number can be any number, such as 2, 3, 4, 5, 6, and so on.

In some embodiments, four fluid channels are arranged offset by 90 degrees in a circumferential direction around the through-hole.

In some embodiments, the fiber arrangement is a gas-tight arrangement.

The fiber can be an anti-resonant hollow core fiber or a hollow core photonic bandgap fiber.

In some embodiments, the invention relates to a fiber arrangement, which comprises a hollow core optical fiber, and at least one ferrule attached to the fiber. The ferrule comprises a tube-like body, which provides a through-hole in which the fiber is inserted. The ferrule and the hollow core provide a volume for a fluid, such as a gas or a mixture of gases, and the piezo device having a variable length is arranged in the ferrule such that a change of length of the piezo device causes a change of the size of the volume, which is available for the fluid.

In some embodiments, a ferrule is attached to an end of the fiber, wherein an optical window is arranged on a first axial end of the ferrule and the fiber end is inserted into a second axial end of the tube-like body. The ferrule can seal the fiber end in a gas tight fashion. The optical window can serve to couple radiation into the hollow fiber or to output broadband radiation from the fiber depending on whether the ferrule is attached to an input or output end of the fiber. Preferably, the fiber arrangement includes at least two ferrules with one ferrule, which is attached to the input end of the fiber and the other ferrule being attached to the output end of the fiber.

At least one ferrule can be arranged on an intermediate portion of the fiber. The intermediate portion of the fiber is the part of the fiber which is not a fiber end. Thus, the fiber can protrude through the tube-like body of the ferrule. In some embodiments, a plurality of ferrules is arranged on an intermediate portion of the fiber, for example at regular intervals. One or more ferrules arranged on an intermediate portion of the fiber can help to provide a homogeneous pressure distribution within the hollow core of the fiber, or they can help to provide a desired pressure gradient along the length of the hollow core of the fiber.

In some embodiments, the piezo device is arranged in a chamber of the ferrule, wherein the chamber is in fluid communication with the interior of the tube-like body and the hollow fiber. The ferrule can serve as a save place for housing the piezo device. Electric lines for providing an electric signal to the piezo device can be led out of the ferrule, in particular in a gas-tight fashion.

In some embodiments, the chamber has an annular form and is arranged in a circumferential direction around the tube-like body of the ferrule. The piezo device can also have a ring-shaped form and it can be designed to fit into the annular chamber. The center axis of the annular chamber can at least in substance match with the center axis of the fiber.

In some embodiments, the chamber can have a cylindrical form. When the ferrule is mounted on the fiber, a center axis of the cylindrical chamber can be arranged in parallel or at an angle, for example 90°, to the center axis of the hollow fiber.

In some embodiments, the chamber is dimensioned such that the piezo device is appropriately received in the chamber. Thus, the chamber can have a form that can match with the outer form of the piezo device.

In some embodiments, a filling, in particular a gas tight filling and/or a filling of a deformable material, is arranged between an outer surface of the piezo device and an inner surface of the chamber. The piezo device can be cushioned in the filling.

The filling can compensate a decrease of the outer diameter of the piezo device while the piezo device is extended in length. The filling can in particular seal the region between the outer surface of the piezo element and the inner surface of the chamber which faces the outer surface of the piezo element. Thereby, the fluid cannot flow into the space which might be available due to a length extension of the piezo device which can result in a decrease of the outer diameter of the piezo element in the region between the outer surface of the piezo element and the inner surface of the chamber. Rather, the piezo device can act as a piston that can push the fluid out of the chamber when the length of the piezo device is extended.

In some embodiments, the length of the piezo device is changeable between a maximally extended position and a minimally extended position. Correspondingly, the volume can be changeable between a minimal volume when the piezo device is at the maximally extended position and a maximal volume when the piezo device is at the minimally extended position.

In some embodiments, in the maximally extended position, the piezo device can extend over the complete length of the chamber in which the piezo device is arranged.

In some embodiments, one or more fluid channels extend in a radial direction through the tube-like body to connect fluidly the chamber with the interior of the tube-like body. In some embodiments, a number of fluid channels are spaced evenly around the circumference of the tube-like body. The number of fluid channels can be any number, like 2, 3, 4, 5, and so on. In some embodiments, in a circumferential direction, four fluid channels are arranged offset by 90 degrees.

The present disclosure also relates to an optical system for providing light pulses, such as broadband light pulses, the optical system comprises a fiber arrangement in accordance with the present invention, a pulsed laser source for providing laser pulses to the fiber arrangement, and at least one piezo driver for driving the piezo device arranged in the at least one housing, in particular ferrule, of the fiber arrangement.

In some embodiments, the at least one piezo driver is configured to drive the at least one piezo device in dependence on a pulse repetition rate of the laser pulses.

In some embodiment, the fiber arrangement comprises at least two housings, in particular ferrules, arranged at a distance from each other along the fiber, wherein the at least one piezo driver is configured to drive the piezo devices of the at least two housings, in particular ferrules, to generate a desired pressure distribution in the hollow core of the fiber. In particular, a homogeneous pressure distribution or a pressure gradient along the length of the hollow core of the fiber can be created.

In some embodiments, the fiber arrangement comprises at least one housing, in particular ferrule, at each fiber end and optionally at least one housing, in particular ferrule, on an intermediate portion of the fiber.

The present disclosure also relates to a method of generating light pulses, in particular broadband light pulses, in particular in the ultraviolet frequency range, with an optical system in accordance with the present invention.

In some embodiments, the method comprises:

Inputting laser pulses into the fiber arrangement to generate light pulses, in particular broadband light pulses, which are output by the fiber arrangement, and while inputting the laser pulses, controlling the at least one piezo device arranged in the at least one housing, in particular ferrule, to generate the light pulses with a desired frequency spectrum or to generate the pulses such that different pulses comprise different frequency spectra. The generated pulses can in particular be broadband light pulses. The at least one piezo device allows controlling the pressure distribution of the fluid in the hollow core of the fiber. Consequently, the spectral range that is covered by the generated broadband output pulsed can be controlled in dependence on the length of the at least one piezo device. The at least one piezo device can in particular be controlled such that the generated output pulses cover a desired spectral range. In other embodiments, the at least one piezo device can be controlled so that pulses of a sequence of broadband output pulses sweep over a larger spectral range.

The generated output pulses can have wavelengths in the ultraviolet wavelength region, for example below 380 nm.

The invention also relates to a fiber arrangement, in particular for providing light pulses, such as broadband light pulses, preferably in the ultraviolet frequency range, which comprises:

- a hollow core optical fiber with a hollow core and a volume for a fluid, such as a gas or a mixture of gases, and a piezo device with a variable length which is arranged such that a change of length of the piezo device causes a change of the density or pressure of the fluid in the volume of the fluid.

The described apparatuses and methods can be employed for tuning non-linear effects that can occur in the hollow fiber and that depend on the pressure of the fluid in the hollow core. Thus, the piezo device can change or modulate the density of the fluid in the hollow core of the fiber, and thereby any non-linear effect that depends on the fluid density can be affected and, correspondingly, used for the generation of light pulses in the fiber.

Preferred embodiments of the present invention will now be described by way of example only and with reference to the accompanying drawings in which.

Figure 1:
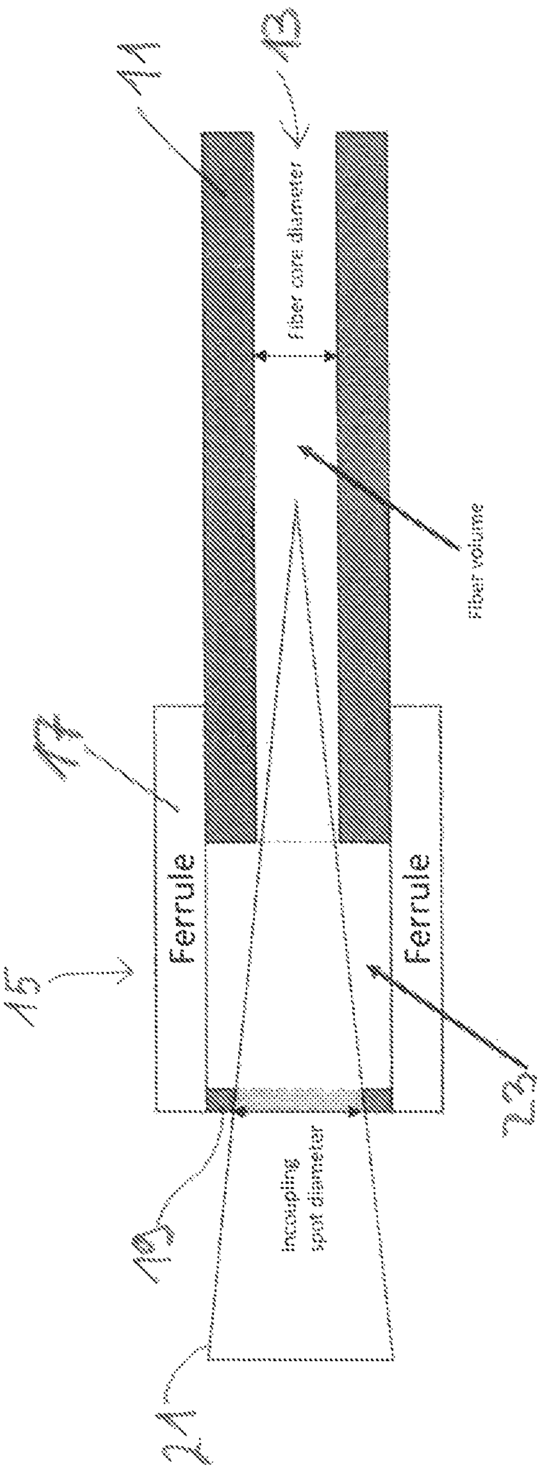
FIG. 1 shows schematically a cross-sectional view of a fiber arrangement known from prior art.

The fiber arrangement shown in FIG. 1 comprises an optical fiber 11 which has a hollow core 13. The core 13 runs along the fiber's length, where it forms the center portion of the fiber 11. The core 13 is surrounded by at least one cladding of the fiber. As the core 13 is hollow, it can be filled with a fluid, for example a gas or a mixture of gases.

The fiber arrangement 11 comprises a housing 15, which is in the described examples a ferrule. The ferrule 15 has a tube-like body 17 that provides a through-hole for insertion of the fiber 11. The through-hole of the tube-like body 17 is open at one axial end. An end of the fiber 11 is inserted into the open end of the through-hole of the tube-like body 17 as shown in FIG. 1. The other axial end of the through-hole in the ferrule 15 is closed with an optical window 19, which can serve as an entrance window for laser pulses that are input into the optical fiber 11.

The housing can also be another element than a ferrule, for example, it can be a material block that provides a chamber for a piezo device and a through-hole for insertion of the fiber 11 (not shown).

A light cone 21 of a focused laser pulse is shown in FIG. 1. The fiber end of the fiber 11 is distal from the optical window 19. Thus, also within the length of the ferrule 15, a laser pulse can be focused down to a cross-sectional spot size which is smaller than the diameter of the fiber core 13. Thereby, ablation of material of the cladding of the fiber 11 can be avoided. A typical material of a cladding is silica. The ablation thresholds for silica surfaces are typically on the order of 3 $J/mc^2$ for femtosecond pulses. An exemplary value of a diameter of the fiber core 13 is 27 μm.

A corresponding ferrule 15 can be arranged at the opposite end of the fiber 11 (not shown), and the optical window 19 of this ferrule can serve as an exit window for broadband light pulses generated in the fiber 11 from the input laser pulses. Both ferrules, i.e. the ferrule 15 at the first fiber end and the other ferrule at the second fiber end, can close the fiber ends in a gas-tight way.

The volume 23 which is provided in the interior of the tube-like body 17 of the ferrule 15 and in the hollow core 13 can be filled with a fluid, such as a gas or a mixture of gases. The fluid can interact with the input laser pulses and, for example, form broadband or even supercontinuum light pulses due to nonlinear processes occurring during the interaction between the input light pulses and the fluid.

Figure 2:
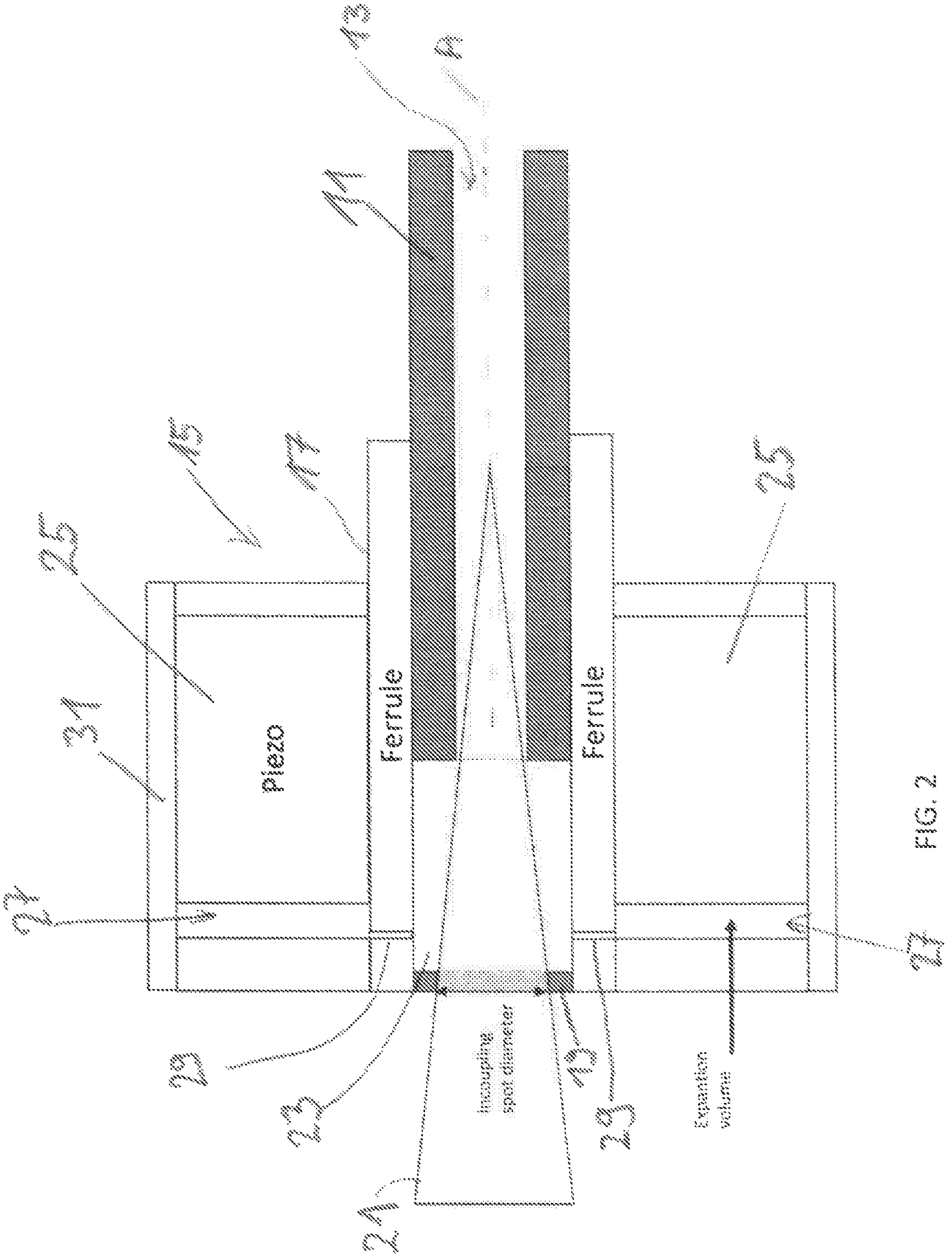
FIG. 2 shows schematically a cross-sectional view of an embodiment of a fiber arrangement in accordance with the present invention.
Figure 3:
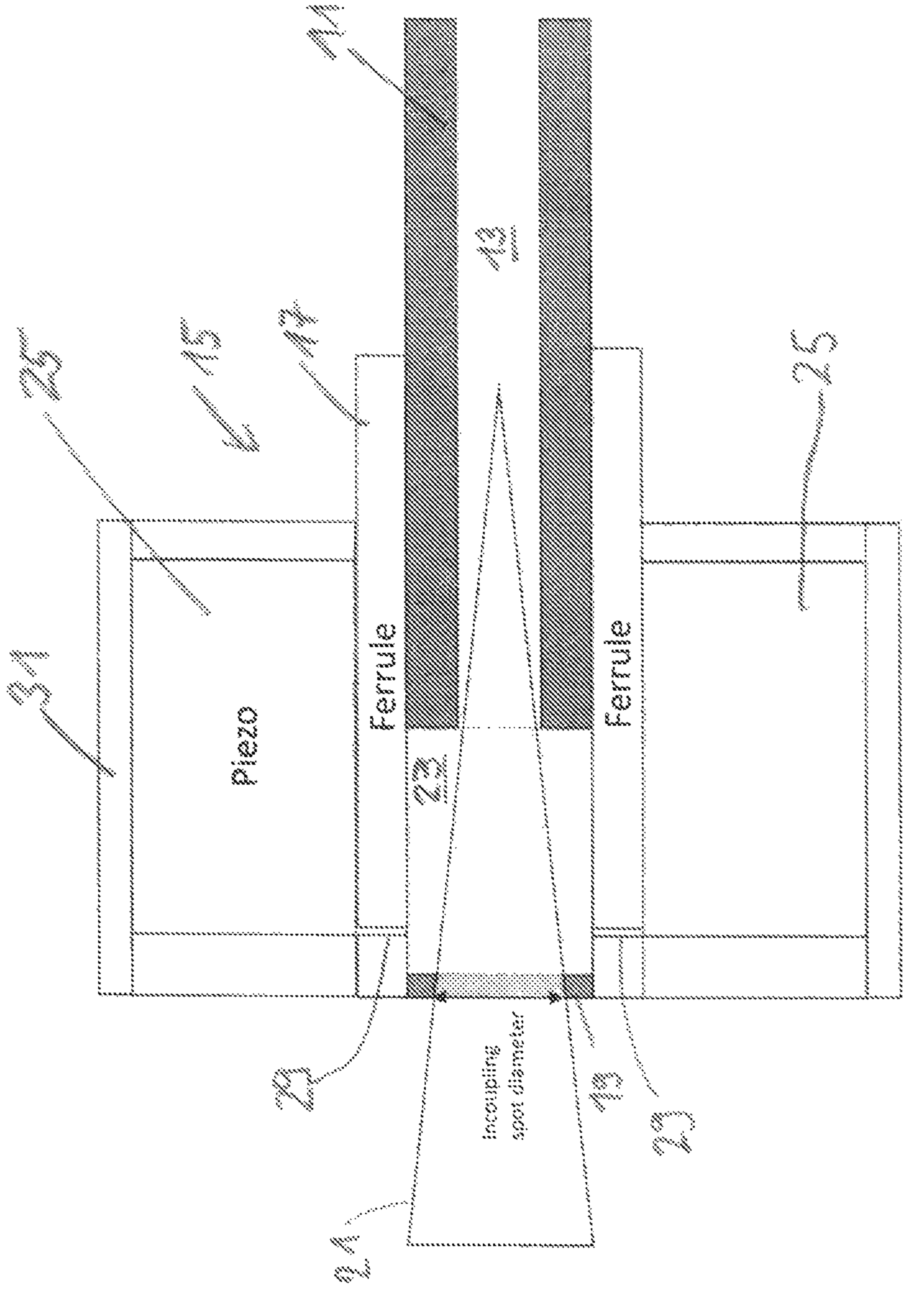
FIG. 3 shows schematically also the fiber arrangement of FIG. 2 in a cross-sectional view.
Figure 4:
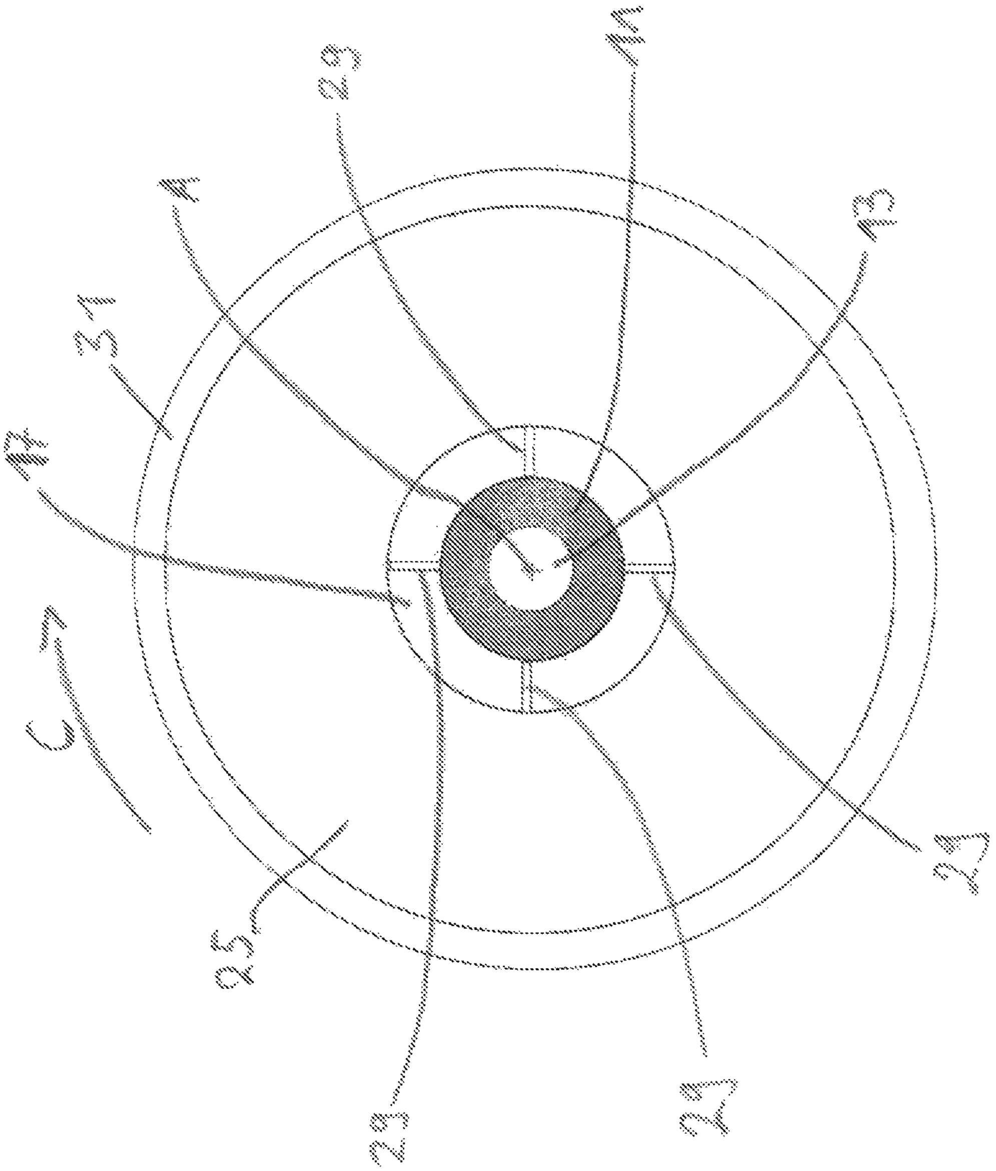
FIG. 4 shows schematically a further cross-sectional view of the fiber arrangement of FIG. 2.

FIGS. 2 to 4 show an embodiment of a fiber arrangement in accordance with the present invention. The fiber arrangement comprises a piezo device 25 which is arranged in the ferrule 15. More specifically, the piezo device 25 is arranged in a chamber 27 of the ferrule 15. The chamber 27 is in fluid communication with the interior of the tube-like body 17 and the core 13 of the hollow fiber 11.

In the embodiment of FIGS. 2 to 4, one or more fluid channels 29 extend in a radial direction through the tube-like body 17 from the chamber 27 to the interior of the tube-like body 17. Thus, the volume which is available for the fluid is extended by the volume of the chamber 27.

As shown in FIG. 4, in the described embodiment, four fluid channels 29 are arranged offset by 90° with respect to the circumferential direction C and extend in a radial direction through the tube-like body 17 to connect fluidly the chamber 27 and the interior of the tube-like body 17 and the hollow core 13.

As illustrated with regard to FIGS. 2 and 3, the length of the piezo device 25 can be changed. A change of the length of the piezo device 25 causes a change of the size of the volume which is available for the fluid. Consequently, as is for example clear from the ideal gas law, the pressure of the fluid in the volume 23 can be changed in dependence on the length of the piezo device 25.

In the embodiment of FIGS. 2 to 4, the chamber 27 has an annular form and it is arranged in a housing section 31 which extends in the circumferential direction C around the tube-like body 17 of the ferrule 15. The housing section 31 and the tube-like body 17 preferably form a single piece. Furthermore, preferably, the chamber 27 is dimensioned such that the piezo device 25 is appropriately received in the chamber 27. Therefore, the piezo device 25 can fill out the chamber 27. In particular, as shown in FIG. 3, when the piezo device 25 has reached its maximally extended position, the piezo device 25 extends over the complete length of the chamber 27.

The piezo device can for example have an outer diameter of 8 mm, an inner diameter of 4 mm and an axial length of 36 mm. The axial length can be changed by 25 μm with a modulation up to a resonant frequency of 40 kHz. Such an actuator can modulate the volume with up to 0.9 $mm^3$.

In some embodiments, two or more of such piezo devices 25 can be arranged in series behind each other and arranged in the same chamber 27, so that even a larger volume modulation can be achieved.

Figure 5:
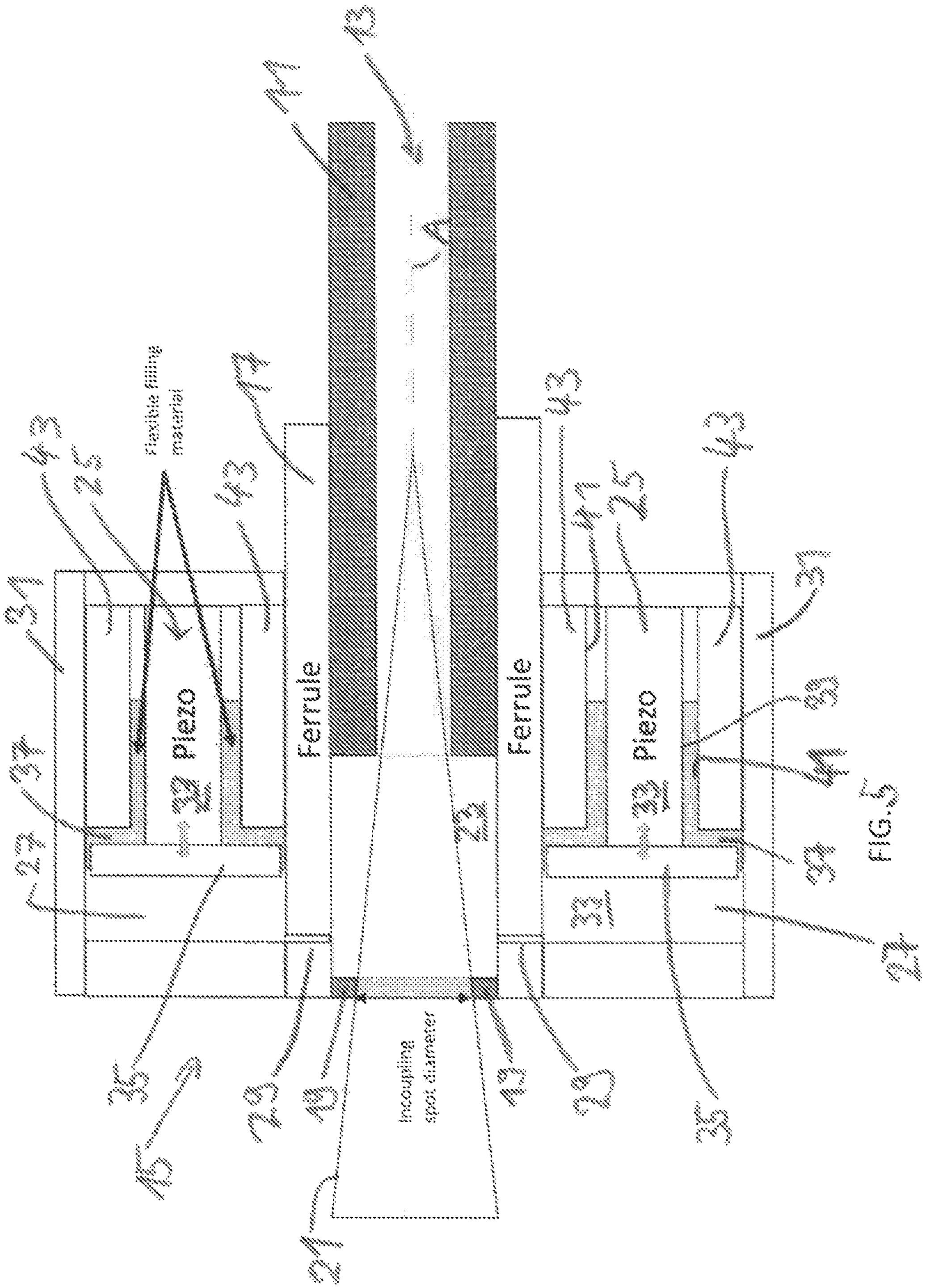
FIG. 5 shows schematically a cross-sectional view of a further embodiment of a fiber arrangement in accordance with the present invention.

The embodiment of a fiber arrangement shown in FIG. 5 differs from the previously described embodiment of FIGS. 2 to 4 in that the piezo device 25 comprises a piezo element 33, which has an annular form, and an end plate 35 which is fixed to an end of the piezo element 33 as shown in FIG. 5. The end plate 35 faces the volume 23 which is available for the fluid in the chamber 27. The end plate 35 has an annular form. The cross-sectional size of the end plate 35 corresponds in substance to the cross-sectional size of the chamber 27, when seen in a radial direction.

The piezo element 33 can be controlled, in particular by use of a piezo controller which is connected to the piezo element 33 (not shown in FIG. 5), such that the axial length of the piezo element 33 can be extended or contracted. The piezo element 33 and the end plate 35 can act as a piston that can push the fluid out of the chamber 27 when the piezo element 35 is extended or it can pull the fluid into the chamber 27 when the piezo element 35 is contracted.

A filling 37 is arranged between outer surfaces 39 of the piezo element 33 and inner surfaces 41 of the housing section 31. In the embodiment of FIG. 5, the inner surfaces 41 are surfaces of guiding rings 43 which support the piezo element 33. The guiding rings 43 can be concentrically arranged at the radial inside and at the radial outside of the piezo element 33 to hold the piezo element 33 and the filling 37 in place and support a change in length of the piezo element 33.

The filling 37 can also extend between a radially outer surface of the end plate 35 and the opposing inner surface of the housing section 31. The filling 37 can be made of a deformable material. The filling 37 can seal the chamber 27 against the space which is taken up by the piezo device 25 in the housing section 31. In particular, the filling 37 can form a seal in the region between the radially outer surface of the end plate 35 and the inner surface of the housing section 31.

Referring again to the embodiment of FIGS. 2 to 4, it can also comprise a filling 37 between the radially outer end inner surfaces of the piezo device 25 and the opposing surfaces of the housing section 31 and of the tube-like body 17. The filling can act as a gas-tight seal and compensate a decrease in width of the piezo device caused by an extension of the length of the piezo device 25.

Figure 6:
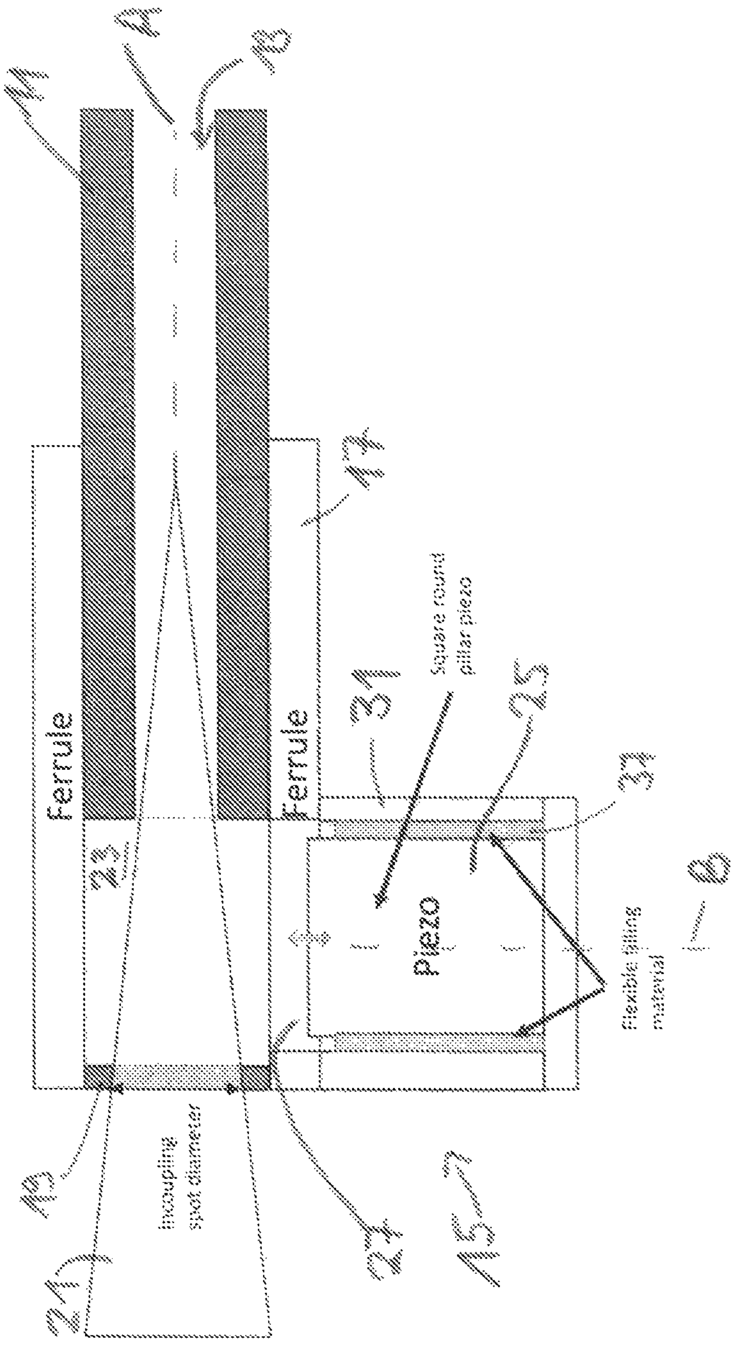
FIG. 6 shows schematically a further embodiment of a fiber arrangement in a cross-sectional view.

In the fiber arrangement of FIG. 6, the piezo device 25 is arranged in a chamber 27 which is provided by a housing section 31 that is arranged on the outer side of the tube-like body 17. A center axis B of the housing 31 extends at an angle of 90° with regard to the center axis A of the tube-like body 17 of the ferrule 15 and the hollow fiber 11. The housing section 31 can have any shape, for example cylindrical, quadratic or rectangular.

Between the inner surface of the housing section 31 and the piezo device 25, a filling 37 is arranged. The filling 37 is made of a flexible material and it can also act as a sealing. The volume 23 can extend into the chamber 27 in such a way that the material of the tube-like body 17 which is covered by the housing section 31 is completely removed. In other words, the fluid channel through the tube-like body 17 is formed by a rather large sidewall hole in the tube-like body 17 which has a cross-sectional area that corresponds in substance to the cross-sectional area of the chamber 27.

Figure 7:
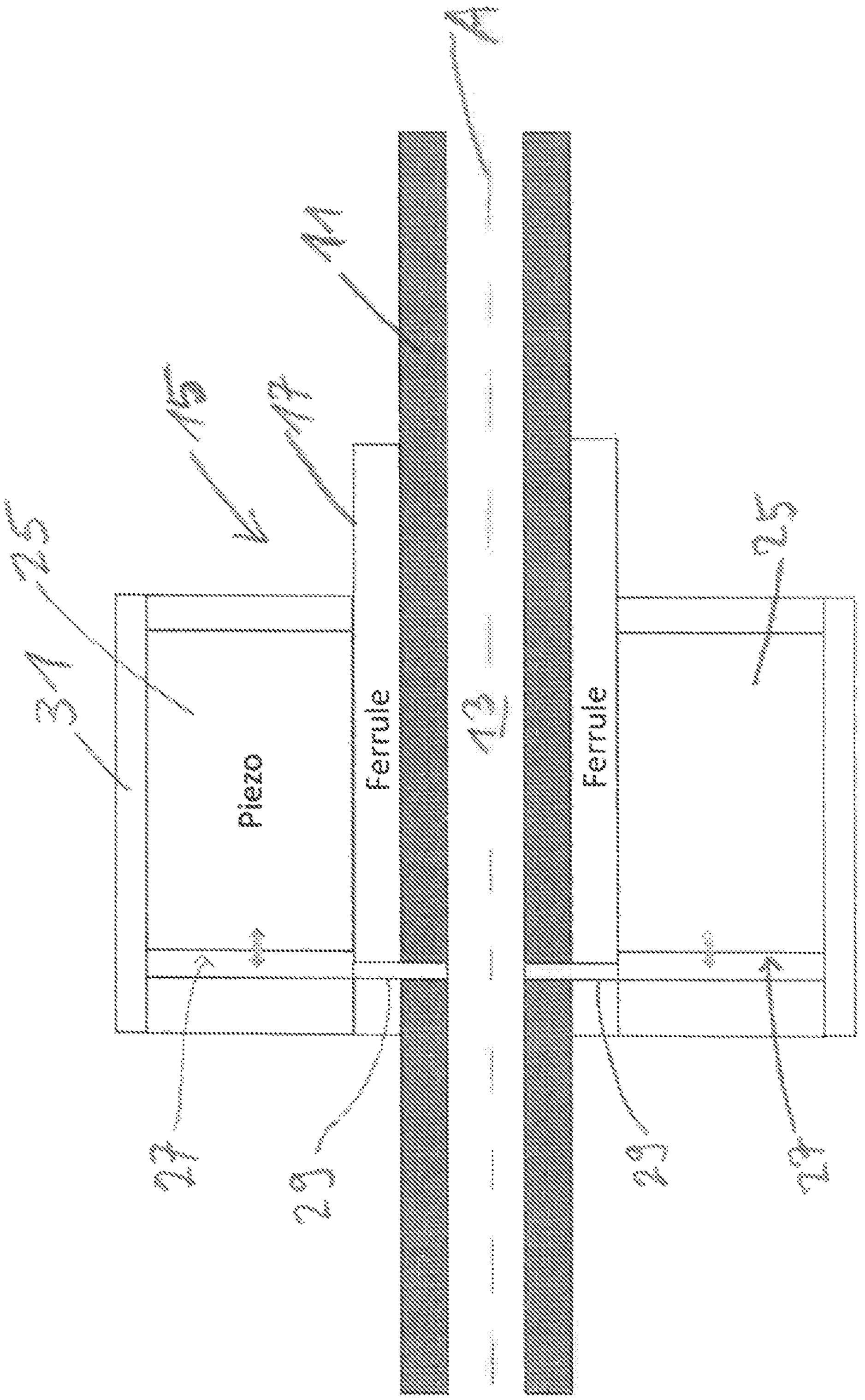
FIG. 7 shows schematically a cross-sectional view of a further embodiment of a fiber arrangement in accordance with the present invention.

The fiber arrangement shown in FIG. 7 is based on the design of the embodiment of FIGS. 2 to 4. However, the ferrule 15 of the fiber arrangement of FIG. 7 does not include an optical window 19. Instead, both ends of the tube-like body 17 are open ends and the fiber 11 protrudes through the tube-like body 17. In other words, the ferrule 15 is arranged on an intermediate portion of the fiber 11, and the fluid channels 29 run in a radial direction through the tube-like body 17 and the fiber 11 to connect fluidly the chamber 27 and the hollow core 13 of the fiber 11.

Depending on the length of the fiber 11, more than one ferrule 15 can be arranged on the fiber 11 (not shown). For example, the ferrules 15 can be arranged at regular intervals on the fiber 11.

Figure 8:
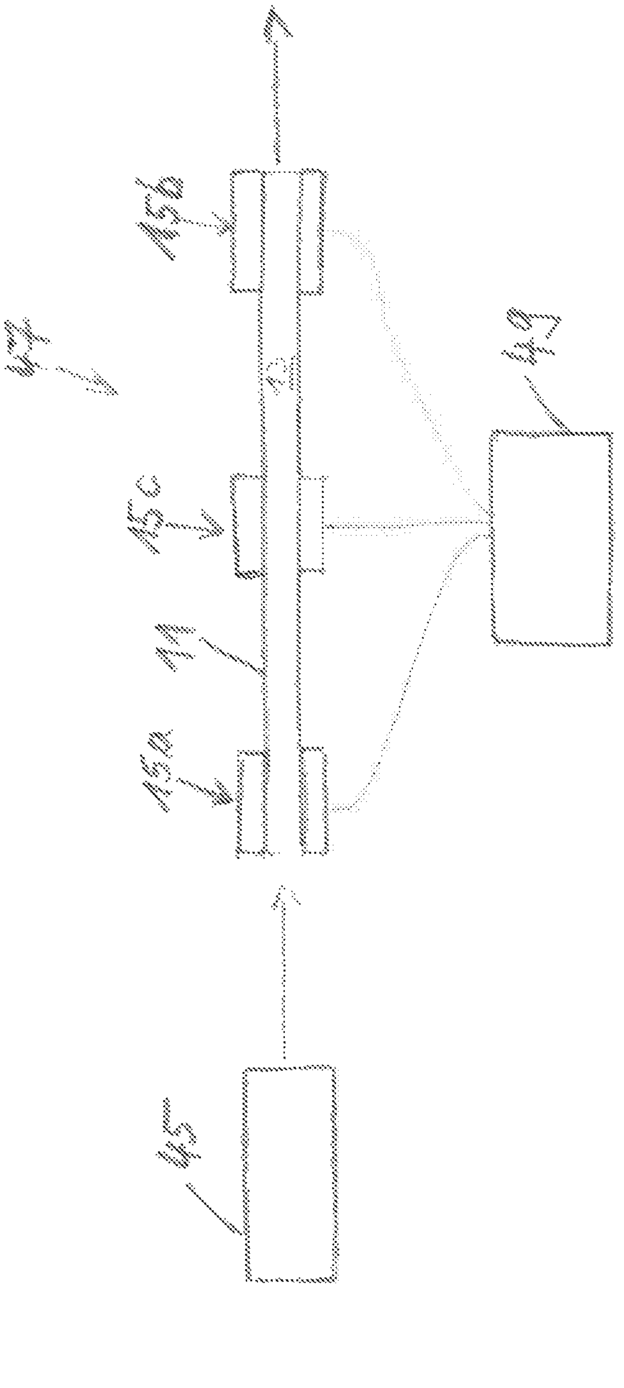
FIG. 8 shows schematically an optical system in accordance with the present invention.

FIG. 8 shows schematically an optical system for providing broadband light, in particular supercontinuum light, which comprises a pulsed laser source 45 for providing laser pulses to a fiber arrangement 47, and a piezo driver 49.

The fiber arrangement 47 includes an optical fiber 11 with a hollow core 13 as described before. A ferrule **15*a* is arranged at a first end of the fiber 11, and a further ferrule 15*b* is arranged on a second end of the fiber 11 as shown in FIG. 8. The ferrules 15*a* and 15*b* can in particular correspond to the ferrules as described previously with regard to FIGS. 2 to 6. Optionally, the fiber arrangement can further comprise ferrule 15*c* which is arranged on an intermediate portion of the fiber 11. The ferrule 15*c* can in particular correspond to the ferrule 15 as described with regard to FIG. 7**.

The piezo driver 19 is connected to the piezo devices 25 (see FIGS. 2 to 7) in the ferrules **15*a*, 15*b* and 15*c* and configured to drive individually each piezo device 25**.

In operation, for example, the piezo driver 49 can drive the piezo devices 25 in phase. Then, all piezo devices 25 reach simultaneously their maximally extended length and their minimally extended length. In another example, the piezo devices 25 are being operated out of phase. Different piezo devices 25 therefore reach their maximally extended length at different times.

Moreover, in some embodiments, each piezo device 25 can be controlled so that its length changes over time according to a defined profile. This is in particular possible, since the piezo devices 25 can be controlled individually.

In some embodiments, the piezo devices 25 are controlled such that a desired homogeneous pressure distribution is obtained along the length of the hollow core 13 of the fiber 11.

In other embodiments, the piezo device 25 are controlled such that a desired pressure gradient is obtained along the length of the hollow core 13 of the fiber 11.

In one embodiment the length change of the piezo devices can be modulated at a steady frequency over a period of time. In one such embodiment a pulsed laser is focused into the hollow fiber and the pulses of this laser arrives at a second steady frequency in the same interval of time. In one such embodiment, the frequency of the modulation of the piezo is matched to the frequency of the laser pulses or to a integer fraction e.g. ½, ⅓, ¼. . . 1/n of the frequency of the laser pulses. In one such embodiment, one can additionally control the delay or phase shift between the frequency of the laser pulses and the frequency of the piezo modulation.

In some embodiments, the entire sealed volume, which is basically formed by the fiber core 13 and the volume 23 and the volume of the chamber 27, can be varied by a factor of approximately 3 due to a change of the length of the piezo device 25. This in turn will vary the pressure and density of the fluid with a factor of approximately 3.

In some embodiments, the change in density or pressure of the fluid is more than 50%, 60%, 70%, 80% or 90%.

In some embodiments the change in density or pressure of the fluid is more than 10%, such as more than 20%, such as more than 25%, such as more than 30%, such as more than 40%, such as more than 50%, such as more than 75%, such as changed by a factor or 1:2, such as changed by a factor or 1:3 such as changed by a factor or 1:4 such as changed by a factor or 1:5 such as changed by a factor or 1:7.5 such as changed by a factor or 1:10.

LIST OF REFERENCE SIGNS

11 optical fiber
13 hollow core
15 ferrule, housing
**15*a*** ferrule
**15*b*** ferrule
**15*c*** ferrule
17 tube-like body
19 optical window
21 light cone
23 volume
25 piezo device
27 chamber
29 fluid channel
31 housing section
33 piezo element
35 end plate
37 filling
39 outer surface
41 inner surface
43 guiding ring
45 pulsed laser source
47 fiber arrangement
49 piezo driver
A center axis
B center axis
C circumferential direction

The invention claimed is:

1. A fiber arrangement for providing broadband light, comprising:

a hollow core optical fiber, and at least one housing having a chamber in which a piezo device is arranged, the piezo device comprising a piezo material having a variable length in response to an electric signal provided to said piezo material; and the chamber being in fluid communication with a hollow core of the fiber such that a change of length of the piezo device causes a change of the size of a volume which is provided by the hollow core and the chamber for a fluid.

2. The fiber arrangement of claim 1, wherein the housing comprises a through-hole having an opening at a first axial end of the housing and an opening at a second axial end of the housing, and wherein the fiber is inserted in the through-hole.

3. The fiber arrangement of claim 2, wherein the housing is a ferrule which is attached to the fiber, and wherein the ferrule comprises a tube-like body which provides the through-hole in which the fiber is inserted.

4. The fiber arrangement in accordance with claim 2, wherein an optical window closes the opening of the through-hole on the first axial end of the respective housing and a fiber end is inserted in the second axial end of the through-hole of the housing.

5. The fiber arrangement in accordance with claim 2, wherein the ferrule is a fiber optic ferrule configured to hold and align the fiber, and wherein the piezo device is arranged in the ferrule such that the volume of the fiber is controlled via the piezo device and via the fiber optic ferrule.

6. The fiber arrangement in accordance with claim 1, wherein:

(i) the housing is a ferrule, and wherein the ferrule, is attached to an end of the fiber; or (ii) at least two housings are provided, the at least two housings being ferrules, with one housing of the at least two housings being attached to one end of the fiber and the other housing of the at least two housings being attached to the other end of the fiber.

7. The fiber arrangement in accordance with claim 1, wherein the chamber has an annular form and is arranged in a circumferential direction around a through-hole of the housing.

8. The fiber arrangement in accordance with claim 1, wherein the chamber comprises a center axis which is arranged in parallel or at an angle to a center axis of a through-hole of the housing.

9. The fiber arrangement in accordance with claim 1, wherein a filling, the filling comprising at least one of a gas tight filling and a filling of a deformable material, is arranged between an outer surface of the piezo device and an inner surface of the chamber.

10. The fiber arrangement in accordance with claim 1, wherein, in a maximally extended position, the piezo device extends over the complete length of the chamber in which the piezo device is arranged.

11. The fiber arrangement in accordance with claim 1, wherein one or more fluid channels extend in a radial direction through the housing to fluidly connect the chamber with a through-hole provided in the housing.

12. The fiber arrangement in accordance with claim 11, wherein a number of fluid channels are spaced evenly around the circumference of the through-hole, or wherein in a circumferential direction around the through-hole four fluid channels are arranged offset by 90 degrees.

13. The fiber arrangement in accordance with claim 1, wherein the fiber arrangement is gas-tight.

14. The fiber arrangement in accordance with claim 1, wherein the fiber is an anti-resonant hollow core fiber or a hollow core photonic bandgap fiber.

15. An optical system for providing broadband light, the optical system comprising:

a fiber arrangement, the fiber arrangement comprising: (i) a hollow core optical fiber, and (ii) at least one housing having a chamber in which a piezo device is arranged, the piezo device comprising a piezo material having a variable length in response to an electric signal provided to said piezo material, and the chamber being in fluid communication with a hollow core of the fiber such that a change of length of the piezo device causes a change of the size of a volume which is provided by the hollow core and the chamber for a fluid;

a pulsed laser source for providing laser pulses to the fiber arrangement; and at least one piezo driver for driving the piezo device arranged in at least one housing of the fiber arrangement.

16. The optical system in accordance with claim 15, wherein at least one of:

(i) the at least one piezo driver is configured to drive the piezo device in dependence on a pulse repetition rate of the laser pulses; and (ii) by changing the length of the at least one piezo device the change in density or pressure of the fluid is more than 50%.

17. The optical system in accordance with claim 15, wherein the fiber arrangement comprises at least two housings, the at least two housings being ferrules, arranged at a distance from each other along the fiber, wherein the at least one piezo driver is configured to drive the piezo devices of the at least two housings to generate a desired pressure distribution in the hollow core of the fiber, to either generate a homogeneous pressure distribution or a pressure gradient in the hollow core of the fiber.

18. The optical system in accordance with claim 15, wherein the fiber arrangement comprises at least one housing, the at least one housing being a ferrule, at each fiber end.

19. A method of generating broadband light in the UV frequency range, with an optical system, the optical system comprising:

(a) a fiber arrangement, the fiber arrangement comprising: (i) a hollow core optical fiber; and (ii) at least one housing having a chamber in which a piezo device is arranged, the piezo device comprising a piezo material having a variable length in response to an electric signal provided to said piezo material, and the chamber being in fluid communication with a hollow core of the fiber such that a change of length of the piezo device causes a change of the size of a volume which is provided by the hollow core and the chamber for a fluid;

(b) a pulsed laser source for providing laser pulses to the fiber arrangement; and (c) at least one piezo driver for driving the piezo device arranged in at least one housing of the fiber arrangement, the method comprising:

inputting laser pulses into the fiber arrangement to generate broadband pulses, which are output by the fiber arrangement; and while inputting the laser pulses, controlling the piezo device arranged in the at least one housing to generate the broadband pulses with a desired frequency spectrum or to generate the broadband pulses such that different pulses comprise different frequency spectra.

20. A fiber arrangement for providing broadband light, comprising:

a hollow core optical fiber, and at least one housing having a chamber in which a piezo device comprising a piezo actuator is arranged, the piezo actuator having a variable length and the chamber being in fluid communication with a hollow core of the fiber such that a change of length of the piezo actuator causes a change of the size of a volume which is provided by the hollow core and the chamber for a fluid.

* * * * *